Sept. 6, 1966  W. A. SIMRIL  3,270,420
GONIOMETER
Filed March 13, 1964
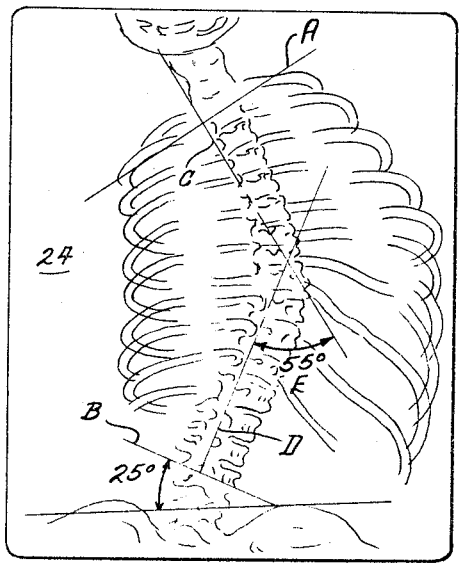
FIG.1
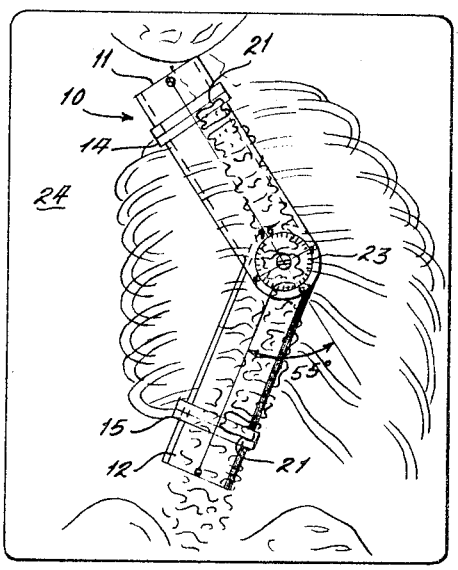
FIG.2
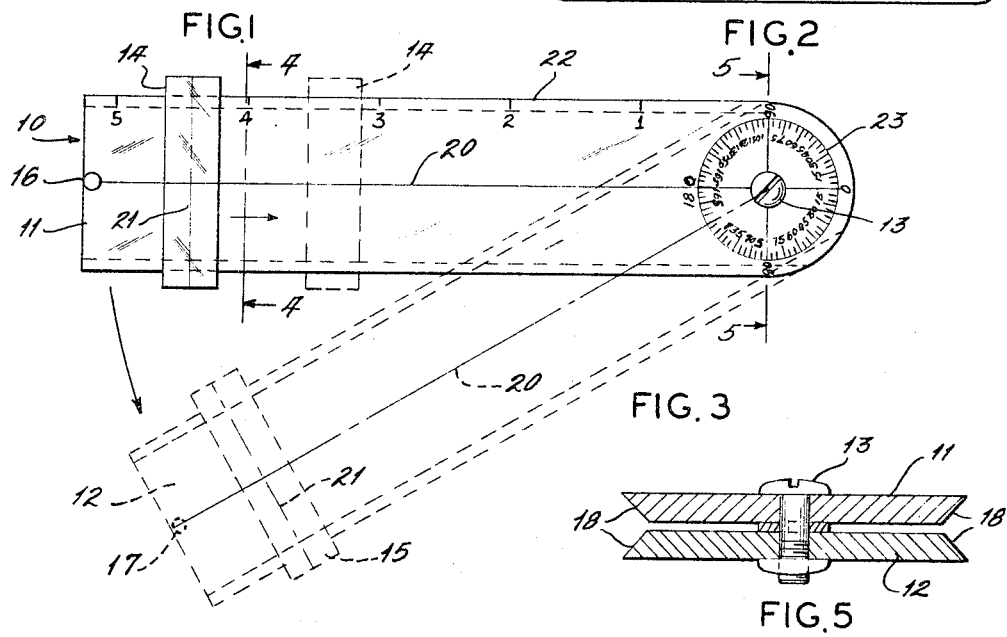
FIG.3
FIG.5
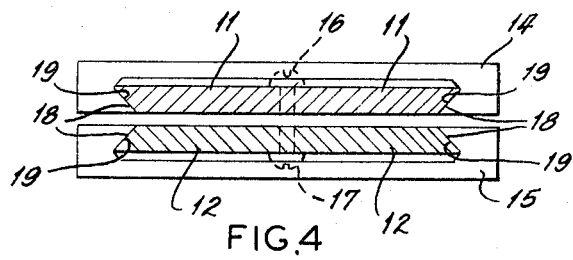
FIG.4
INVENTOR.
WAYNE A. SIMRIL
BY
Gravely, Lieder & Woodruff United States Patent Office 3,270,420
Patented Sept. 6, 1966

3,270,420
GONIOMETER
Wayne A. Simril, 21 Somerset Downs,
St. Louis County 24, Mo.
Filed Mar. 13, 1964, Ser. No. 351,685
1 Claim. (Cl. 33—75)

The present invention relates to a goniometer for measuring the angle of curvature of the spine from an X-ray film, and specifically relates to a compact simple device which may be positioned on the film without marking the film to read the angle of curvature in a fast, simple, efficient and reproducible manner.

In the management of scoliosis or curvature of the spine it is essential for the orthopedic surgeon to measure the degree of angulation present in the spine in different positions and at different times in the course of treatment. Several methods of measuring the angle of curvature of the spine have been devised. The most commonly employed method is known as the Cobb method. Using the Cobb method, straight lines are drawn on an X-ray film across the top of the first vertebra in the upper part of the curve and the bottom of the last vertebra in the lower part of the curve. Then perpendiculars are erected from the lines and the angle measured where the perpendiculars cross. This method thus uses a straight edge and protractor and requires that four lines be drawn and an angle measured. Using the Cobb method, the X-ray film is permanently marred and many chances for inaccuracy are present due to the many human steps involved.

Using the present device, no lines need be drawn on the X-ray film and the angle of curvature is read directly from a protactor carried by the instrument. Using the present device, measurement of the angle of curvature is speeded and objectionable lines are not drawn on the films. Furthermore, consistency and reproducibility of the measurement is enhanced.

Therefore, one of the principal objects of the present invention is to provide a device for measuring the angle of curvature from an X-ray film in a fast, simple, efficient and reproductible manner, without marking the film.

Another object of the present invention is to provide an instrument for measuring the degree of angulation of the spine directly from an X-ray film, said instrument including a pair of pivoted arms having a protractor surrounding the pivot point and sliding bars mounted on the arms and adapted to be positioned on the film in a manner such that the degree of angulation can be rapidly and accurately read from the included protractor without marking the film or taking the time to draw lines and measure angles.

These and other objects and advantages will become apparent hereinafter.

The present invention comprises a device for measuring the degree of angulation of the spine from an X-ray including a pair of arms pivotally connected together and means for positioning the arms on an X-ray film in a manner so that the degree of angulation can be read directly from the protractor.

The present invention further comprises the apparatus and method hereinafter described and claimed.

In the drawings, wherein like numbers refer to like parts wherever they occur,

FIG. 1 is a plan view of an X-ray film showing the conventional Cobb method of measuring the angle of curvature of the spine, FIG. 2 is a plan view of an X-ray film showing the present positioned thereon with the angle of curvature read directly from the device itself, FIG. 3 is a plan view of the present structure for measuring the curvature of the spine showing the arms in a closed position in solid lines and showing one arm swung to an angle measuring position in broken lines, FIG. 4 is a sectional view taken along line 4—4 of FIG. 3, and FIG. 5 is a sectional view taken along line 5—5 of FIG. 3.

In the conventional Cobb method of measuring the angle of curvature of the spine, as shown in FIG. 1, a line A is drawn along the top edge of the first vertebra in the upper part of the curve and a second line B is drawn along the bottom of the last vertebra in the lower part of the curve. Perpendiculars C and D are erected from the lines A and B, respectively, and the angle E where the perpendiculars cross is the angle which is measured. This method requires the use of a straight edge and a protractor and requires that four lines, A, B, C, and D, be drawn on the film, and further requires that one angle E be measured.

FIGS. 3–5 show the construction of the present invention and FIG. 2 shows its use positioned on an X-ray film with the angle of curvature being read directly from the instrument. This will be described in more detail hereinafter.

The goniometer 10 or device for measuring curvature of the spine includes a pair of arms 11 and 12 pivoted at 13 adjacent to one end thereof, and provided with longitudinally movable slides 14 and 15 which are retained on the arms 11 and 12 by stop members 16 and 17 positioned at the outermost extremity of the arms 11 and 12, respectively.

The arms 11 and 12 and the slides 14 and 15 are each transparent, and at least semi-rigid, preferably rigid, in nature. Each of the arms 11 and 12 includes tapered longitudinal edges 18 and the slides 14 and 15 include runways 19 which grip the edges 18 of the arms and are longitudinally slidable therealong (FIG. 4). The longitudinal movement of the slide 14 along the arm 11 is indicated by the broken lines in FIG. 3.

Each of the arms 11 and 12 is provided with a longitudinal score line 20 which is positioned in the center of the arm and runs from the pivot point 13 to the stop member 16 or 17. Each of the slides 14 and 15 is provided with a transverse score line 21, which is perpendicular to the corresponding longitudinal score line 20 on the arm associated with the slide. The arm 11 is graduated in increments of length along one longitudinal edge (indicated by the numeral 22 in FIG. 3). This measurement may be in centimeters or inches.

An integral protractor 23 having its center at the pivot point 13 is positioned on the arm 11. The protractor 23 is divided into increments of degrees from 0 to 180 to 0 with 0–180 line being aligned with the score line 20 of its associated arm 11 and the 0 mark being most remote from the slide member 14.

In use (FIG. 2), the device 10 is so positioned that the arm 11 having the protractor 23 thereon is uppermost with respect to the X-ray film 24 and the slide 14 associated with the arm 11 is positioned along the spine so that the score line 21 on the slide 14 is aligned with the top edge of the first vertebra in the upper part of the curve. The device 10 then is manipulated so that the score line 21 on the bottom slide 15 is positioned along the bottom edge of the last vertebra in the lower part of the curve. The angle of curvature then is read directly from the protractor 23.

Thus it is seen that the present invention provides a simple, efficient and reliable method for making reproducible measurements of the angle of curvature of a spine from an X-ray film.

This invention is intended to cover all changes and modifications of the examples of the invention herein chosen for purposes of the disclosure, which do not constitute departures from the spirit and scope of the invention.

What I claim is:

A goniometer for measuring the angle of curvature of the spine from an X-ray film comprising a pair of arms pivotally connected together adjacent to one end, said arms being at least semi-rigid and transparent and having their side edges beveled inwardly, slide members longitudinally movable along each arm for positioning each of the arms perpendicular to the lateral edge of the vertebrae defining the curved portion of the spine on an X-ray film of the spine, each of said slide members having a groove with undercut side portions receiving said arm, said undercut portions cooperating with said bevel surfaces to slidably secure said members on said arms with the inner side of the end portions of each member substantially in the plane of the inner side of its respective associated arm, each of the arms being provided with a longitudinal score line, said line intersecting at the pivotal attachment, said slide members being transparent and each provided with a transverse score line perpendicular to the score line of the associated arm, said transverse score lines in operative position being positioned along the edges of the vertebrae forming the curved portion of the spine, and protractor means fixedly positioned on one of the arms centered on the pivotal connection, said protractor means reading from 0–180–0 in increments with the 0 point being most removed from the associated slide and the 0–180 line being aligned with the score line on the arm, whereby the angle of curvature of the spine may be read between the 0 mark on the protractor and the intersection of the longitudinal score line of the other arm with the protractor.

References Cited by the Examiner

UNITED STATES PATENTS

| | | | |
|---|---|---|---|
| 1,201,334 | 10/1916 | Neilsen | 33—76 |
| 1,310,547 | 7/1919 | Sanborn | 33—98 |
| 1,878,119 | 9/1932 | Dowd | 33—105 |
| 2,735,185 | 2/1956 | Naphtal | 33—120 |
| 2,892,586 | 6/1959 | Graham | 33—1 X |
| 2,972,810 | 2/1961 | Davis | 33—107 X |
| 3,130,496 | 4/1964 | Copeland | 33—75 X |

FOREIGN PATENTS

| | | |
|---|---|---|
| 51,358 | 3/1936 | Denmark. |
| 129,966 | 5/1959 | Russia. |
| 119,749 | 4/1927 | Switzerland |

LEONARD FORMAN, *Primary Examiner.*

ISAAC LISANN, *Examiner.*

H. N. HAROIAN, *Assistant Examiner.*